US006143974A

United States Patent [19]

Dahl

[11] Patent Number: 6,143,974

[45] Date of Patent: Nov. 7, 2000

[54] METHOD FOR ADDITIVE SYNTHESIS OF SOUND

[76] Inventor: Philip Y. Dahl, 7798 Hearthside Ave. S. #105, Cottage Grove, Minn. 55016

[21] Appl. No.: 09/344,769

[22] Filed: Jun. 25, 1999

[51] Int. Cl.[7] .................................................. G01H 5/02

[52] U.S. Cl. .................................................. 84/659; 84/660

[58] Field of Search .............................. 84/622, 659, 660

[56] References Cited

U.S. PATENT DOCUMENTS 6,011,213 1/2000 Duruoz .................................. 84/622 X

OTHER PUBLICATIONS leiter (Philip Y. Dahl), "K5k Programing Made Easy", post to internet bulletin board at http://www.InsideThe Web.com/messageboard/mbs.cgi/mb22787, (Jun. 27, 1998).

Kawai K5000S Owner's Manual, pp. 37–50, Kawai Musical Inst. Mfg. Co., Ltd., Japan) (exact date unknown, c. 1996).

Leete, "The Fun of the Fairlight", Sound On Sound, Apr., 1999 (Fairlight Synthesizer dates to c. 1980).

Wiffen, "Life of Oscar", Sound On Sound, Sep., 1999 (OSCar Synthesizer dates to c. 1983)

"Kyma Sound Design Workstation" (brochure) (Symbolic Sound Corp., Champaign, IL) (1997).

"New Hardware for Kyma Sound Design Workstation" (brochure) (Symbolic Sound Corp., Champaign, IL) (date unknown).

Anderton, "Symbolic Sound Kyma", EQ reprint (Oct., 1998).

Miller, "Symbolic Sound Kyma 4.5 (Mac/Win)", Electronic Musician reprint (Jan., 1998).

Chadabe, "Symbolic Sound Kyma", Keyboard reprint (Jul., 1998).

Colbeck, Keyfax Omnibus Edition, pp. 48–49, 94–95 and 126–127 (MixBooks, Emeryville, CA) (1996).

*Primary Examiner*—Jeffrey Donels

[57] ABSTRACT

This invention provides a method of additive synthesis of sound wherein the amplitude A of a plurality of harmonics having frequency n*f, where f is the fundamental frequency and n is the harmonic number, is calculated by use of a formula selected from those belonging to the family described by Formula I:

$$A(n)=P*[(1/n^a)(\sin)(\pi n(X\%))^b(\cos(\pi n(X\%))^c(\sin(\pi n(X'\%))^{b'}(\cos(\pi n(X'\%))^{c'}(\sin(\pi n(X''\%))^{b''}(\cos(\pi n(X''\%))^{c''}\ldots]+Q*[(1/n^d)(\sin(\pi n(Y\%))^e(\cos(\pi n(Y\%))^g(\sin(\pi n(Y'\%))^{e'}(\cos(\pi n(Y'\%))^{g'}(\sin(\pi n(Y''\%))^{e''}(\cos(\pi n(Y''\%))^{g''}\ldots]+ \quad [I]$$

wherein coefficients P; a; X, X', X", etc.; Q; d; Y, Y', Y", etc.; are real numbers, and coefficients b, b', b", etc.; c, c', c", etc.; e, e', e", etc.; g, g', g", etc. are non-negative integers;

or Formula II:

$$A(n)=P*[(1/n^a)\times|\sin(\pi n(X\%)|^b\times|\cos(\pi n(X\%)|^c\times|\sin(\pi n(X'\%)|^{b'}\times|\cos(\pi n(X'\%)|^{c'}\times|\sin(\pi n(X''\%)|^{b''}\times|\cos(\pi n(X''\%)|^{c''}\ldots]+Q*[(1/n^d)\times|\sin(\pi n(Y\%)|^e\times|\cos(\pi n(Y\%)|^g\times|\sin(\pi n(Y'\%))|^{e'}\times|\cos(\pi n(Y'\%))|^{g'}\times|\sin(\pi n(Y''\%))|^{e''}\times|\cos(\pi n(Y''\%)|^{g''}\ldots]+ \quad [II]$$

wherein coefficients P; a; X, X', X", etc.; Q; d; Y, Y', Y", etc.; are real numbers, and coefficients b, b', b", etc.; c, c', c", etc.; e, e', e", etc.; g, g', g", etc. are non-negative real numbers.

20 Claims, 1 Drawing Sheet

METHOD FOR ADDITIVE SYNTHESIS OF SOUND

FIELD OF THE INVENTION

This invention relates to a method of additive synthesis of sound wherein the amplitude A of a plurality of harmonics having frequency n*f, where f is the fundamental frequency and n is the harmonic number, is calculated by use of a formula belonging to the family described by Formula I:

$$A(n)=P^*[(1/n^a)(\sin)(\pi n(X\%))^b(\cos(\pi n(X\%))^c(\sin(\pi n(X'\%))^{b'}(\cos(\pi n(X'\%))^{c'}(\sin(\pi n(X''\%))^{b''}(\cos(\pi n(X''\%))^{c''}\ldots]+Q^*[(1/n^d)(\sin(\pi n(Y\%))^e(\cos(\pi n(Y\%))^g(\sin(\pi n(Y'\%))^{e'}(\cos(\pi n(Y'\%))^{g'}(\sin(\pi n(Y''\%))^{e''}(\cos(\pi n(Y''\%))^{g''}\ldots]+ \quad [I]$$

wherein coefficients P; a; X, X', X", etc.; Q; d; Y, Y', Y", etc.; are real numbers, and coefficients b, b',b", etc.; c, c', c", etc.; e, e', e", etc.; g, g', g", etc. are non-negative integers;

or Formula II:

$$A(n)=P^*[(1/n^a)\times|\sin(\pi n(X\%)|^b\times|\cos(\pi n(X\%)|^c\times|\sin(\pi n(X'\%)|^{b'}\times|\cos(\pi n(X'\%)|^{c'}\times|\sin(\pi n(X''\%)|^{b''}\times|\cos(\pi n(X''\%)|^{c''}\ldots]+Q^*[(1/n^d)\times|\sin(\pi n(Y\%)|^e\times|\cos(\pi n(Y\%)|^g\times|\sin(\pi n(Y'\%))|^{e'}\times|\cos(\pi n(Y'\%))|^{g'}\times|\sin(\pi n(Y''\%))|^{e''}\times|\cos(\pi n(Y''\%)|^{g''}\ldots]+ \quad [II]$$

wherein coefficients P; a; X, X', X", etc.; Q; d; Y, Y', Y", etc.; are real numbers, and coefficients b, b', b", etc.; c, c', c", etc.; e, e', e", etc.; g, g', g", etc. are non-negative real numbers.

BACKGROUND OF THE INVENTION

Additive synthesis of sound involves the electronic creation of complex waveforms by adding together simple waveforms such as sine waves. The simple waveforms are "partials" or "harmonics" of the resulting complex waveform. The electronic waveform, which may be represented digitally, or as a voltage, or by other electronic means, is converted to audible sound by known means including D/A conversion and an amplifier-loudspeaker combination.

This method has been applied to commercially available sound synthesizers. Examples include the Kawai Model K5, and recently the Kawai Model K5000. (See, http://www.ozemail.com.au/~kawaioz/k5000.htm). These synthesizers allow the user to independently specify the amplitude of up to 128 harmonics. As the number of harmonics increases, additive synthesis becomes a more powerful method, capable of generating more complex sounds. However, it also becomes more unwieldy to use due to the number of parameters that must be specified by the user.

Editing softward for the Kawai K5000 is available from Emagic Soft- and Hardward GmbH, however, it does not enable functional specification of harmonic profiles. (See, http://www.emagicusa.com/english/products/index.html).

SUMMARY OF THE INVENTION

Briefly, the present invention provides a method of additive synthesis of sound wherein the amplitude A of a plurality of harmonics having frequency n*f, where f is the fundamental frequency and n is the harmonic number, is calculated by use of a formula belonging to the family described by Formula I:

$$A(n)=P^*[(1/n^a)(\sin)(\pi n(X\%))^b(\cos(\pi n(X\%))^c(\sin(\pi n(X'\%))^{b'}(\cos(\pi n(X'\%))^{c'}(\sin(\pi n(X''\%))^{b''}(\cos(\pi n(X''\%))^{c''}\ldots]+Q^*[(1/n^d)(\sin(\pi n(Y\%))^e(\cos(\pi n(Y\%))^g(\sin(\pi n(Y'\%))^{e'}(\cos(\pi n(Y'\%))^{g'}(\sin(\pi n(Y''\%))^{e''}(\cos(\pi n(Y''\%))^{g''}\ldots]+ \quad [I]$$

wherein coefficients P; a; X, X', X", etc.; Q; d; Y, Y', Y", etc.; are real numbers, and coefficients b, b',b", etc.; c, c', c", etc.; e, e', e", etc.; g, g', g", etc. are non-negative integers;

or Formula II:

$$A(n)=P^*[(1/n^a)\times|\sin(\pi n(X\%)|^b\times|\cos(\pi n(X\%)|^c\times|\sin(\pi n(X'\%)|^{b'}\times|\cos(\pi n(X'\%)|^{c'}\times|\sin(\pi n(X''\%)|^{b''}\times|\cos(\pi n(X''\%)|^{c''}\ldots]+Q^*[(1/n^d)\times|\sin(\pi n(Y\%)|^e\times|\cos(\pi n(Y\%)|^g\times|\sin(\pi n(Y'\%))|^{e'}\times|\cos(\pi n(Y'\%))|^{g'}\times|\sin(\pi n(Y''\%))|^{e''}\times|\cos(\pi n(Y''\%)|^{g''}\ldots]+ \quad [II]$$

wherein coefficients P; a; X, X', X", etc.; Q; d; Y, Y', Y", etc.; are real numbers, and coefficients b, b', b", etc.; c, c', c", etc.; e, e', e", etc.; g, g', g", etc. are non-negative real numbers.

In another aspect, the present invention provides a method of additive synthesis wherein the amplitudes A(n) are calculated by use of a formula belonging to the family described by Formulas I or II, as above, wherein each A(n) is recalculated periodically using updated values of the coefficient parameters, which are: P; a; X, X', X", etc.; b, b', b", etc.; c, c', c", etc.; Q; d; Y, Y', Y", etc.; e, e', e", etc.; g, g', g", etc. Furthermore, the present invention provide a method whereby the coefficient parameters may be modulated during sound production to provide a resulting sound that varies in timbre.

What has not been described in the art, and is provided by the present invention, is a means to make additive synthesis more workable by reducing the large number of variables presented to a few meaningful numbers, and in particular by use of the formula provided in the method of the present invention.

It is an advantage of the present invention to provide a workable method for additive synthesis of musically interesting sounds.

DETAILED DESCRIPTION OF PREFERRED EMBODIMENTS

Figure 1:
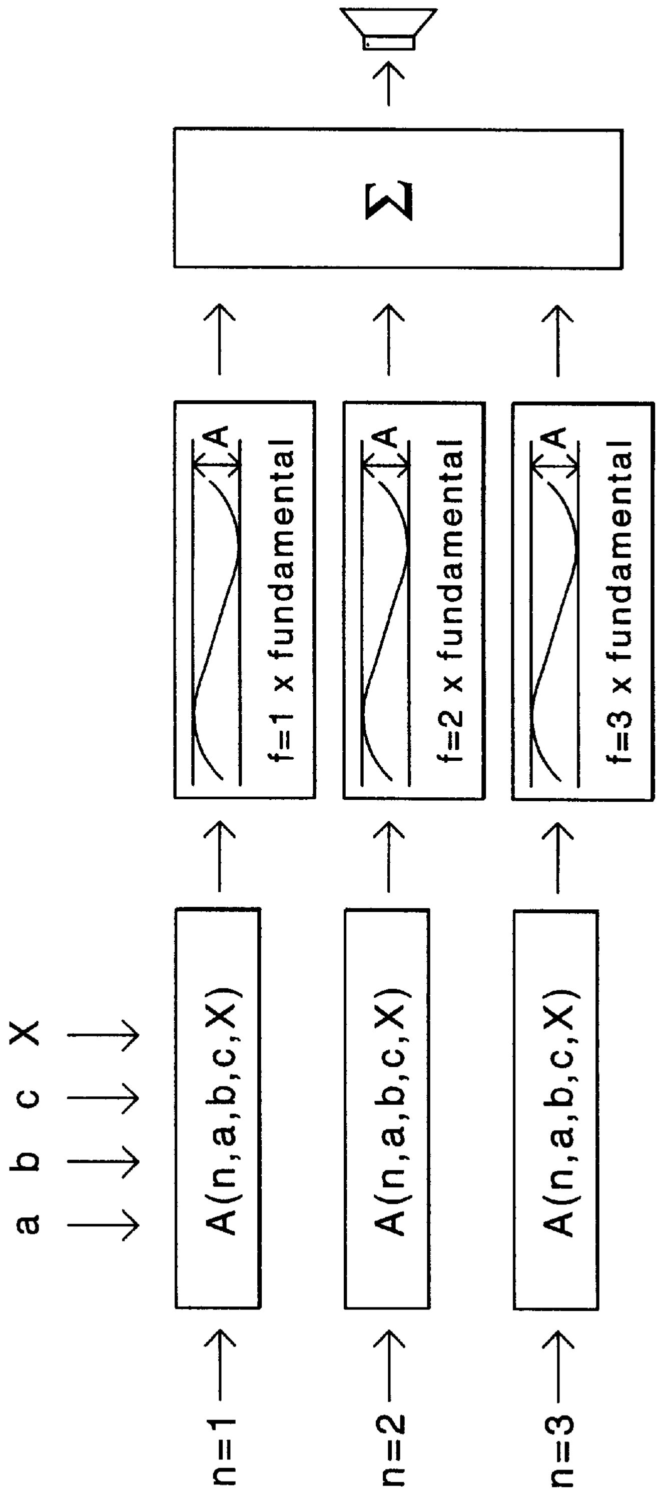

The present invention provides a means to make additive synthesis more workable by reducing the large number of variables presented to a few meaningful numbers, and in particular by use of formulas belonging to the family described by Formula I:

$$A(n)=P^*[(1/n^a)(\sin)(\pi n(X\%))^b(\cos(\pi n(X\%))^c(\sin(\pi n(X'\%))^{b'}(\cos(\pi n(X'\%))^{c'}(\sin(\pi n(X''\%))^{b''}(\cos(\pi n(X''\%))^{c''}\ldots]+Q^*[(1/n^d)(\sin(\pi n(Y\%))^e(\cos(\pi n(Y\%))^g(\sin(\pi n(Y'\%))^{e'}(\cos(\pi n(Y'\%))^{g'}(\sin(\pi n(Y''\%))^{e''}(\cos(\pi n(Y''\%))^{g''}\ldots]+ \quad [I]$$

wherein coefficients P; a; X, X', X", etc.; Q; d; Y, Y', Y", etc.; are real numbers, and coefficients b, b',b", etc.; c, c', c", etc.; e, e', e", etc.; g, g', g", etc. are non-negative integers;

or Formula II:

$$A(n)=P^*[(1/n^a)\times|\sin(\pi n(X\%)|^b\times|\cos(\pi n(X\%)|^c\times|\sin(\pi n(X'\%)|^{b'}\times|\cos(\pi n(X'\%)|^{c'}\times|\sin(\pi n(X''\%)|^{b''}\times|\cos(\pi n(X''\%)|^{c''}\ldots]+Q^*[(1/n^d)\times|\sin(\pi n(Y\%)|^e\times|\cos(\pi n(Y\%)|^g\times|\sin(\pi n(Y'\%))|^{e'}\times|\cos(\pi n(Y'\%))|^{g'}\times|\sin(\pi n(Y''\%))|^{e''}\times|\cos(\pi n(Y''\%)|^{g''}\ldots]+ \quad [II]$$

wherein coefficients P; a; X, X', X", etc.; Q; d; Y, Y', Y", etc.; are real numbers, and coefficients b, b', b", etc.; c, c', c", etc.; e, e', e", etc.; g, g', g", etc. are non-negative real numbers.

Additive synthesis may be accomplished by any known method. Oscillators creating each harmonic may be discrete analog or digital circuits, but preferably the specification of each harmonic and the addition of the harmonics to form the final waveform is all done in the digital domain, by calculation using known methods. Preferably, the amplitude and frequency of each harmonic are first determined, according to the present invention, for a point in time. It is contemplated that additional processing of the harmonic amplitudes may occur at this point; for example, filtering functions may be applied which raise or lower the amplitude of selected harmonics, e.g. all harmonics above a certain frequency. The harmonics, represented to this pint by frequency and amplitude numbers, may then be added to form a single waveform output. This may be done by reference to a lookup table to obtain sinusoidal waveforms. It is contemplated that additional processing of the waveform may occur at this point, which may include any process applicable to an audio waveform, including filtering, time-based effects, compression, etc. The output should be either a digital or analog audio signal that may be converted into an audible sound by ordinary means, including D/A conversion, amplification, and use of loudspeakers or headphones.

The method of the present invention may be embodied in dedicated equipment or may be embodied in softward for use in a PC, Mac, or other computer platform. Output from a softward embodiment is typically achieved via a soundcard. The output of a softward embodiment may also be routed directly into another softward package such as a hard disk recording and mixing package. Musical performance control is preferably mediated by MIDI.

The harmonic that is lowest in frequency is designated the fundamental. The frequencies of the other harmonics are related to that of the fundamental by the harmonic number "n", where the frequency of the harmonic designated "harmonic n" is n times that of the fundamental. The values of n may be chosen arbitrarily, but preferably they are specified by a fixed interval, dn, which separates consecutive values. Most preferably, dn=1, and thus all n's are positive integers and form a harmonic series. However, it may also be advantageous to provide a series of harmonies wherein dn>1 by a small amount, so as to provide "stretched" harmonics.

Additive synthesis of sound may require the user to specify the amplitudes of up to 128 harmonics. This programming task can be made workable by reducing this large number of parameters to a few meaningful parameters which advantageously direct the user toward musical results. One way to do this is to use a formula, A(n,a,b,c), that provides an amplitude (A) for each harmonic (n) given values for a few simple variables (a,b,c). A useful formula provides as much meaningful control as possible while using as few variables as possible and produces musical results.

It has been found that many such formulas belong to the family described by Formula I:

$$A(n)=P*[(1/n^{a})(\sin)(\pi n(X\%))^{b}(\cos(\pi n(X\%))^{c}(\sin(\pi n(X'\%))^{b'}(\cos(\pi n(X'\%))^{c'}(\sin(\pi n(X''\%))^{b''}(\cos(\pi n(X''\%))^{c''}\ldots]+Q*[(1/n^{d})(\sin(\pi n(Y\%))^{e}(\cos(\pi n(Y\%))^{g}(\sin(\pi n(Y'\%))^{e'}(\cos(\pi n(Y'\%))^{g'}(\sin(\pi n(Y''\%))^{e''}(\cos(\pi n(Y''\%))^{g''}\ldots]+ \quad [\mathrm{I}]$$

wherein coefficients P; a; X, X', X", etc.; Q; d; Y, Y', Y", etc.; are real numbers, and coefficients b, b',b", etc.; c, c', c", etc.; e, e', e", etc.; g, g', g", etc. are non-negative integers.

If the absolute value of each trigonometric function is taken before it is raised to an exponent, fractional exponents may be used. Thus, useful formulas may also belong to Formula II:

$$A(n)=P*[(1/n^{a})\times|\sin(\pi n(X\%)|^{b}\times|\cos(\pi n(X\%)|^{c}\times|\sin(\pi n(X'\%)|^{b'}\times|\cos(\pi n(X'\%)|^{c'}\times|\sin(\pi n(X''\%)|^{b''}\times|\cos(\pi n(X''\%)|^{c''}\ldots]+Q*[(1/n^{d})\times|\sin(\pi n(Y\%)|^{e}\times|\cos(\pi n(Y\%)|^{g}\times|\sin(\pi n(Y'\%))|^{e'}\times|\cos(\pi n(Y'\%))|^{g'}\times|\sin(\pi n(Y''\%))|^{e''}\times|\cos(\pi n(Y''\%)|^{g''}\ldots]+ \quad [\mathrm{II}]$$

wherein coefficients P; a; X, X', X", etc.; Q; d; Y, Y', Y", etc.; are real numbers, and coefficients b, b', b", etc.; c, c', c", etc.; e, e', e", etc.; g, g', g", etc. are non-negative real numbers.

Formulas using 15 or fewer parameters are preferred, more preferably 10 or fewer, and most preferably 7 or fewer parameters.

Examples of preferred formulas within Formula I include:

$$A(n)=P(1/n^{a})(\sin(\pi n(X\%))^{\wedge b}(\cos(\pi n(X\%))^{\wedge c})+Q(1/n^{d})(\sin(\pi n(Y\%))^{\wedge e})(\cos(\pi n(Y\%))^{\wedge g})$$

$$A(n)=P(1/n^{a})(\sin(\pi n(X\%))^{\wedge b}(\sin(\pi n(Y\%))^{\wedge c})+Q(1/n^{d})(\sin(\pi n(X\%))^{\wedge e})(\sin(\pi n(Z\%))^{\wedge g})$$

Examples of most preferred formulas within Formula I include:

$$A(n)=(1/n^{a})(\sin(\pi n(X\%))^{\wedge b})(\cos(\pi n(X\%))^{\wedge c})(\sin(\pi n(Y\%))^{\wedge d}(\cos(\pi n(Y\%))^{\wedge e}) \quad [\mathrm{III}]$$

$$A(n)=(1/n^{a})(\sin(\pi n(X\%))^{\wedge b})(\sin(\pi n(Y\%))^{\wedge c})(\sin(\pi n(Z\%))^{\wedge d})$$

$$A(n)=P(1/n^{a})(\sin(\pi n(X\%)))(\sin(\pi n(Y\%)))+Q(1/n)(\sin(\pi n(X\%))(\sin(\pi n(Z\%))) \quad [\mathrm{IV}]$$

A Formula II version of each of the preceding formulas may be generated by taking the absolute value of each trigonometric function before it is raised to an exponent.

An embodiment of the present invention may be dedicated to a single formula belonging to the family described by Formulas I or II, presenting a fixed set of variables for adjustment by the user. An alternate embodiment of the present invention allows the user to select from a set of specific formulae belonging to the family described by Formulas I or II. A further alternative of the present invention allows the user to construct formulas within the family described by Formulas I or II.

Preferably, values of each coefficient may be input by user-accessible control devices, which include keypads, mice, touchscreens, ribbon controllers, pedals, and preferably knobs or sliders. Alternately, user-accessible control devices may couple the coefficient value to the output of a function generator such as a low frequency oscillator or an envelope generator. The control parameter values of such function generators may in turn be input by user-accessible control devices. Communication with user-accessible control devices may be mediated by MIDI.

Most preferably, changes in parameter values appearing as input from user-accessible control devices are given immediate effect. The values of A(n) may be recalculated periodically or whenever a parameter value change is received. The resulting change in the output waveform advantageously is reflected in a change of timbre in the audio output.

This invention is useful in the synthesis of musical sound.

Objects and advantages of this invention are further illustrated by the following examples, but the particular materials and amounts thereof recited in these examples, as well as other conditions and details, should not be construed to unduly limit this invention.

EXAMPLES

Harmonic profiles were calculated according to the present invention and entered by hand into a Kawai K5000R additive synthesizer. Sixty-four harmonics were used in each example below. For this synthesizer, the value of dn is fixed at one. For this synthesizer, amplitude values must be converted to harmonic level values (L) as follows: $L(n)=128+(8\times\log_2|A(n)/A(max)|)$. A(max) is usually, but not always, A(l).

Example 1

Harmonic profiles were calculated using formula III:

$$A(n)=(1/n^{a})(\sin(\pi n(X\%))^{\wedge b})(\cos(\pi n(X\%))^{\wedge c})(\sin(\pi n(X'\%))^{\wedge b'}(\cos(\pi n(X'\%))^{\wedge c'}) \quad [III]$$

and the parameters indicated in Table I, following:

TABLE I

| a | b | c | X% | b' | c' | '% | Waveform |
|---|---|---|---|---|---|---|---|
| 1 | 0 | 0 | NV | 0 | 0 | NV | Saw |
| 1 | 1 | 0 | 20% | 0 | 0 | NV | 20% Pulse |
| 1 | 1 | 0 | 50% | 0 | 0 | NV | Square |
| 3 | 1 | 0 | 48% | 2 | 0 | 3.5% | Vintage Analog-style Square |
| 2 | 1 | 0 | 50% | 0 | 0 | NV | Triangle |
| 2 | 2 | 0 | 10% | 0 | 0 | NV | Triangular Pulse (brass-like) |
| 2 | 1 | 0 | 4.5% | 1 | 0 | 6.25% | Trombone Essence* |
| 2 | 1 | 0 | 9% | 1 | 0 | 13% | French Horn Essence* |
| 0.4 | 1 | 0 | 12% | 0 | 1 | 47% | Oboe Essence* |

NV indicates no value is specified. Waveforms designated with an asterisk had a more natural sound after low-pass filtering. These examples indicate that the method of the present invention allowed access to traditional waveforms such as saws, triangles and squares, but also allowed access to more sophisticated waveforms. Most importantly, these examples indicate that, by the method of the present invention, this varied group of waveforms are brought very near to each other in terms of access by a user. Thus, by the method of the present invention, an additive synthesizer may be constructed allowing a user to vary the timbre of a sound among all of the waveforms above, as well as intermediate positions, with the use of a small number of user-accessible control devices such as knobs or sliders. To attempt to achieve the same result by simultaneous adjustment of 64 harmonic amplitudes would be highly impractical.

Example II

Harmonic profiles were calculated using formula IV:

$$A(n)=P(1/n)(\sin(\pi n(X\%)))(\sin(\pi n(Y\%)))+Q(1/n)(\sin(\pi n(X\%))(\sin(\pi n(Z\%))) \quad [IV]$$

This formula was chosen in order to emulate electric guitar sounds, where P and Q are the relative volumes of two (theoretical) pickups, X% is the string plucking position, Y% is the position of one pickup, and Z% is the position of the second pickup, where each position is a distance along a (theoretical) string from the bridge as a percentage of the length of the string. Resulting sounds had a distinctly guitar-like quality. Again, by the method of the present invention, an additive synthesizer may be constructed allowing a user to vary the timbre of a sound among a wide variety of electric guitar-like sounds, with the use of a handful of user-accessible control devices such as knobs. To attempt to achieve the same result by simultaneous adjustment of 64 harmonic amplitudes would be highly impractical.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of additive synthesis of sound, comprising the steps of:

a) calculating the amplitude A(n) of a plurality of harmonics having frequency n*f, where f is the fundamental frequency and n is the harmonic number, by use of a calculating formula selected from Formula I:

$$A(n)=P^*\{(1/n^{a})(\sin)(\pi n(X\%))^{b}(\cos(\pi n(X\%))^{c}(\sin(\pi n(X'\%))^{b'}(\cos(\pi n(X'\%))^{c'}(\sin(\pi n(X''\%))^{b''}(\cos(\pi n(X''\%))^{c''}\}+Q^*\{(1/n^{d})(\sin(\pi n(Y\%))^{e}(\cos(\pi n(Y\%))^{g}(\sin(\pi n(Y'\%))^{e'}(\cos(\pi n(Y'\%))^{g'}(\sin(\pi n(Y''\%))^{e''}(\cos(\pi n(Y''\%))^{g''}\} \quad (I)$$

wherein coefficients P; a; X, X', X"; Q; d; Y, Y', Y"; are real numbers, and coefficients b, b', b"; c, c', c"; e, e', e"; g, g', g" are non-negative integers;

and Formula II:

$$A(n)=P^*\{(1/n^{a})\times|\sin(\pi n(X\%)|^{b}\times|\cos(\pi n(X\%)|^{c}\times|\sin(\pi n(X'\%)|^{b'}\times|\cos(\pi n(X'\%)|^{c'}\times|\sin(\pi n(X''\%)|^{b''}\times|\cos(\pi n(X''\%)|^{c''}\}+Q^*\{(1/n^{d})\times|\sin(\pi n(Y\%)|^{e}\times|\cos(\pi n(Y\%)|^{g}\times|\sin(\pi n(Y'\%))|^{e'}\times|\cos(\pi n(Y'\%))|^{g'}\times|\sin(\pi n(Y''\%))|^{e''}\times|\cos(\pi n(Y''\%)|^{g''}\} \quad (II)$$

wherein coefficients P; a; X, X', X"; Q; d; Y, Y', Y"; are real numbers, and coefficients b, b', b"; c, c', c"; e, e', e"; g, g', g" are non-negative real numbers;

d) outputting an electronic signal which may be converted into audible sound.

2. The method according to claim 1, additionally comprising the steps of:

b) altering the value of one or more of the coefficients; and c) recalculating said amplitudes A(n) of said plurality of harmonics.

3. The method according to claim 2 wherein the value of one or more of the coefficients is input from a user-accessible control device.

4. The method according to claim 3 wherein said alteration results in a change in timbre of said audible sound.

5. The method according to claim 1, wherein said calculating formula has 7 or fewer non-zero coefficients selected from P; a; X, X', X"; b, b', b"; c, c', c"; Q; d; Y, Y', Y"; e, e', e"; g, g', g".

6. The method according to claim 5, additionally comprising the steps of:

b) altering the value of one or more of the coefficients; and c) recalculating said amplitudes A(n) of said plurality of harmonics.

7. The method according to claim 6 wherein the value of one or more of the coefficients is input from a user-accessible control device.

8. The method according to claim 7 wherein said alteration results in a change in timbre of said audible sound.

9. The method according to claim 1, wherein said calculating formula is selected from formulas belonging to the family described by Formula I.

10. The method according to claim 9, additionally comprising the steps of:

b) altering the value of one or more of the coefficients; and c) recalculating said amplitudes A(n) of said plurality of harmonics.

11. The method according to claim 10 wherein the value of one or more of the coefficients in input from a user-accessible control device.

12. The method according to claim 11 wherein said alteration results in a change in timbre of said audible sound.

13. The method according to claim 1, wherein said calculating formula is Formula III:

$$A(n)=(1/n^{a})(\sin(\pi n(X\%))^{\wedge b})(\cos(\pi n(X\%))^{\wedge c})(\sin(\pi n(Y'\%))^{\wedge b'}(\cos(\pi n(X'\%))^{\wedge c'}) \quad \text{[III]}$$

wherein coefficients a; X and X' are real numbers and coefficients b, b', c, and c' are non-negative integers.

14. The method according to claim 13, additionally comprising the steps of:

b) altering the value of one or more of the coefficients: a, X, X', b, b', c, c'; and c) recalculating said amplitudes A(n) of said plurality of harmonics.

15. The method according to claim 14 wherein the value of one or more of the coefficients is input from a user-accessible control device.

16. The method according to claim 15 wherein said alteration results in a change in timbre of said audible sound.

17. The method according to claim 1, wherein said calculating formula is Formula IV:

$$A(n)=P(1/n)(\sin(\pi n(X\%)))(\sin(\pi n(Y\%)))+Q(1/n)(\sin(\pi n(X\%))(\sin(\pi n(Z\%))) \quad \text{[IV]}$$

wherein coefficients P, Q, X, Y and Z are real numbers.

18. The method according to claim 17, additionally comprising the steps of:

b) altering the value of one or more of the coefficients; P, Q, X, Y, and Z; and c) recalculating said amplitudes A(n) of said plurality of harmonics.

19. The method according to claim 18 wherein the value of one or more of the coefficients is input form a user-accessible control device.

20. The method according to claim 19 wherein said alteration results in a change in timbre of said audible sound.

* * * * *